(12) United States Patent
Buda et al.

(10) Patent No.: US 8,559,550 B2
(45) Date of Patent: Oct. 15, 2013

(54) METHOD FOR TRANSMITTING A SEQUENCE OF SYMBOLS FOR EXPLOITING TRANSMIT DIVERSITY

(75) Inventors: Fabien Buda, Paris (FR); Bertrand Muquet, Saint-Germain en Laye (FR); Serdar Sezginer, Boulogne Billancourt (FR)

(73) Assignee: Sequans Communications, Paris la Defense Cedex (FR)

( * ) Notice: Subject to any disclaimer, the term of this patent is extended or adjusted under 35 U.S.C. 154(b) by 1107 days.

(21) Appl. No.: 12/489,213

(22) Filed: Jun. 22, 2009

(65) Prior Publication Data

US 2009/0316824 A1    Dec. 24, 2009

(30) Foreign Application Priority Data

Jun. 20, 2008  (EP) .................................. 08290591

(51) Int. Cl.
*H04L 27/00* (2006.01)

(52) U.S. Cl.
USPC ........... 375/295; 375/267; 375/299; 375/146; 455/101; 455/102; 455/103; 714/751; 714/752; 714/786

(58) Field of Classification Search
USPC .......... 299/299, 267; 375/299, 267, 295, 146; 455/101–103; 714/751, 752, 786
See application file for complete search history.

(56) References Cited

U.S. PATENT DOCUMENTS

| 2006/0034390 | A1 | 2/2006 | Vummintala et al. |
| 2007/0002962 | A1* | 1/2007 | Trachewsky .................. 375/267 |
| 2007/0025467 | A1 | 2/2007 | Li |
| 2007/0183527 | A1* | 8/2007 | Jia et al. ......................... 375/267 |
| 2008/0075187 | A1 | 3/2008 | Sutskover |
| 2009/0003466 | A1* | 1/2009 | Taherzadehboroujeni et al. ............................. 375/260 |

OTHER PUBLICATIONS

European Search Report based on European Application Serial No. EP08290591, European Patent Office, Dec. 19, 2008.
Siavash M. Alamounti, "A simple Transmit Diversity Technique for Wireless Communications" IEEE Journal on select areas in communications, Oct. 1998, vol. 16, No. 8, pp. 1451-1458.

* cited by examiner

*Primary Examiner* — Daniel Washburn
*Assistant Examiner* — Rahel Guarino
(74) *Attorney, Agent, or Firm* — Bryan A. Santarelli; Graybeal Jackson LLP

(57) ABSTRACT

An embodiment of a method for transmitting data through at least a channel in a wireless communication system, the method comprising at least the steps of:
  encoding the data by performing a forward-error-correction encoding,
  forming a sequence of symbols from the encoded data,
  forming an M-by-T coding matrix from said sequence of symbols, each column of the coding matrix comprising N different symbols of the sequence of symbols and M−N zeros, N being an integer equal at least to one, T representing the number of consecutive transmission intervals, M representing the total number of transmit antennas, and
  using the coding matrix for transmitting the sequence of symbols during the T consecutive transmission intervals, by transmitting one different column of the coding matrix at each transmission interval through the M transmit antennas, only N transmit antennas are enabled during a given transmission interval.

18 Claims, 1 Drawing Sheet

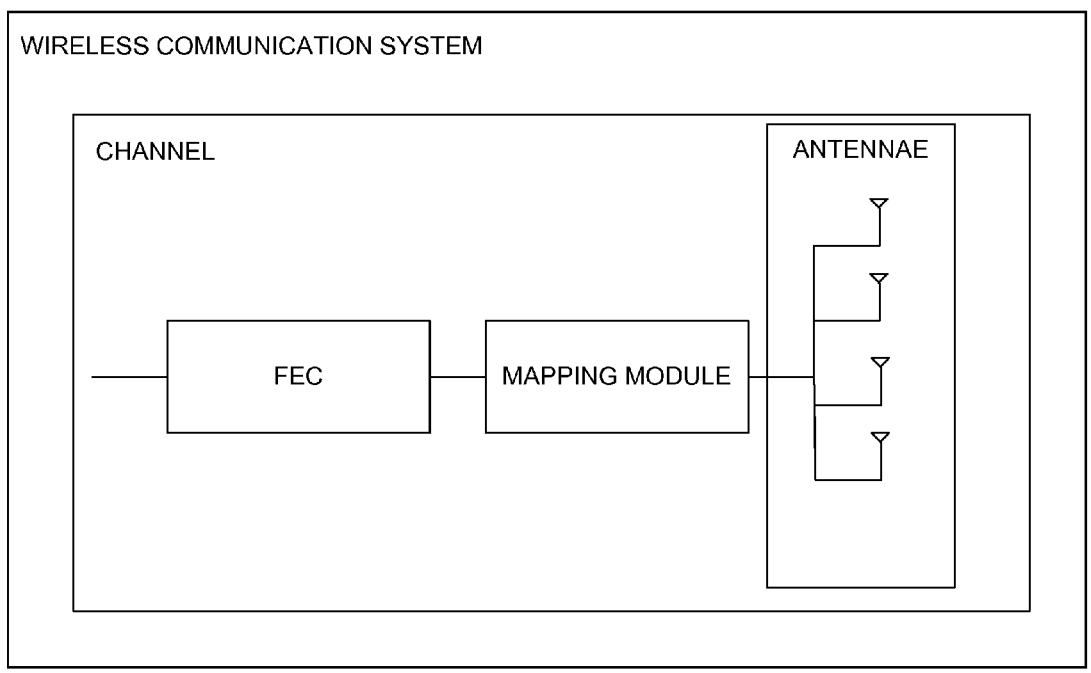

METHOD FOR TRANSMITTING A SEQUENCE OF SYMBOLS FOR EXPLOITING TRANSMIT DIVERSITY

PRIORITY CLAIM

The present application claims the benefit of European Patent Application Serial No. 08290591.0, filed Jun. 20, 2008, which application is incorporated herein by reference in its entirety.

TECHNICAL FIELD

An embodiment of the present invention pertains to wireless communication systems, and more particularly, to a transmit diversity technique for MIMO (multiple-input multiple-output) systems based on STC (space-time code) and FEC (forward-error correction) encoding.

BACKGROUND

Multiple-input multiple-output (MIMO) techniques have become one of the most essential parts of wireless communications systems. Indeed, IEEE 802.16e specifications include several MIMO profiles for two, three and four transmit antennas, and provide transmit diversity, spatial multiplexing (SM) or the advantages of both. However, the current IEEE 802.16e specifications lack a covering of all the interesting space-time codes (STCs) which benefit efficiently from transmit diversity exploited by forward error correction (FEC).

In the IEEE 802.16e specification, the schemes which exploit transmit diversity using STC and/or FEC are defined for two, three, and four transmit antennas. Below, we use the notation XM for denoting matrix X with M rows (rows corresponding to the total number of antennas).

For two transmit antennas a first scheme, namely, coding matrix A2, is defined as:

$$A2 = \begin{bmatrix} s_1 & -s_2^* \\ s_2 & s_1^* \end{bmatrix} \quad (1)$$

$s_1$, and $s_2$ being respectively first and second symbols, and the star designating the complex conjugate.

The scheme defined by the matrix A2 is based on the Alamouti code for transmit diversity (as described in the article S. M. Alamouti, "A simple transmit diversity technique for wireless communications" IEEE Journal on selected areas in communications, vol. 16, n°. 8, pp. 1451-1458, October 1998, which is incorporated by reference.), and consists of grouping the input data symbols two by two and transmitting a pair of symbols ($s_1, s_2$) through two transmit antennas over two time slots (or transmission intervals). Here, the columns correspond to the time slots and the rows correspond to the transmit antennas. Therefore, transmission of coding matrix A2 is realized over two time slots using two transmit antennas.

A second scheme, namely, matrix B2, is based on spatial multiplexing (SM) and is described by:

$$B2 = \begin{bmatrix} s_1 \\ s_2 \end{bmatrix} \quad (2)$$

This scheme is full rate since two symbols are transmitted over two transmit antennas in one time slot but it suffers from diversity loss.

For a higher number of antennas, the generalized forms of Alamouti code and spatial multiplexing (SM) are provided to improve the performance while keeping the detection complexity reasonable. For three transmit antennas the 2×2 STCs given above are generalized as:

$$A3 = \begin{bmatrix} s_1 & -s_2^* & 0 & 0 \\ s_2 & s_1^* & s_3 & -s_4^* \\ 0 & 0 & s_4 & s_3^* \end{bmatrix}, \quad (3)$$

$$B3 = \begin{bmatrix} s_1 \\ s_2 \\ s_3 \end{bmatrix}$$

The matrix A3 benefits from transmit diversity exploited from both (Alamouti) and FEC encoder/decoder. However, SM defined with B3 benefits only from FEC encoder/decoder to exploit transmit diversity.

Similar to the three transmit antennas case, generalized schemes in IEEE 802.16e for four transmit antennas can be defined as:

$$A4 = \begin{bmatrix} s_1 & -s_2^* & 0 & 0 \\ s_2 & s_1^* & 0 & 0 \\ 0 & 0 & s_3 & -s_4^* \\ 0 & 0 & s_4 & s_3^* \end{bmatrix}, \quad (4)$$

$$B4 = \begin{bmatrix} s_1 \\ s_2 \\ s_3 \\ s_4 \end{bmatrix}$$

Again the matrix A4 benefits from transmit diversity exploited by STC and FEC, but the matrix B4 (based on SM scheme) only benefits from transmit diversity exploited by FEC encoder/decoder. All of the schemes mentioned above can also be defined over only the frequency dimension or over both the frequency and time dimensions instead of only over the time dimension.

The patent application US 2007/0183527, which is incorporated herein by reference, provides different alternatives of STCs employing Alamouti code (that is to say involving the use of complex conjugate of the symbol to be transmitted) which have the ability to exploit more transmit diversity with the help of FEC. Their primary goal is to introduce codes which exploit the properties of FEC codes to maintain the advantages of Alamouti codes. Although this transmission scheme provides a better performance than the pure Alamouti scheme, it also suffers from the same rate loss as Alamouti.

SUMMARY

An embodiment of the invention is a method exempt from at least one of the drawbacks previously mentioned. The embodiment proposes notably a solution based on spatial multiplexing that benefits more efficiently from the FEC encoder/decoder for exploiting the transmit diversity.

One advantage of an embodiment of the invention is its interesting performance/rate/complexity trade-offs compared to the existing alternatives.

For this purpose, an embodiment of the invention is a method for transmitting data through at least a channel in a wireless communication system, wherein the method comprises at least the steps of:
- encoding the data by performing a forward-error-correction encoding,
- forming a sequence of independent symbols from the encoded data,
- forming an M-by-T coding matrix from said sequence of independent symbols, said coding matrix comprising only the symbols of said sequence of independent symbols and zeros, each column of the coding matrix comprising N different symbols of the sequence of independent symbols and M−N zeros, N being an integer equal at least to one, T being an integer equal at least to two and representing the number of consecutive transmission intervals, M being an integer greater than N and representing the number of transmit antennas, at least two columns of said coding matrix having zeros at different locations, and
- using the coding matrix for transmitting the sequence of independent symbols during the T consecutive transmission intervals, by transmitting one different column of the coding matrix at each transmission interval through N transmit antennas over the M transmit antennas.

The expression "sequence of independent symbols" means that the sequence does comprise redundant information, namely the sequence does not comprise repeated symbols or a same symbol under a plurality of forms, for example a symbol and the complex conjugate of this symbol.

As the coding matrix comprises only the symbols of this sequence of independent symbols and zeros, the coding matrix does not also comprise redundant information.

Each column of the coding matrix comprises at least a component equal to zero.

Any complex conjugate of symbols may be absent of the coding matrix.

In one embodiment, the coding matrix may be defined as:

$$X4 = \begin{bmatrix} s_1 & 0 \\ s_2 & 0 \\ 0 & s_3 \\ 0 & s_4 \end{bmatrix},$$

X4 being the coding matrix, and
$s_1, s_2, s_3, s_4$ being respectively first, second, third and fourth symbols forming the sequence of symbols.

In another embodiment, the coding matrix may comprise rotated symbols with swapped in-phase and quadrature components over time and spatial dimensions.

For example, the coding matrix may be defined as:

$$X3 = \begin{bmatrix} \tilde{s}_0 & 0 \\ \tilde{s}_1 & \tilde{s}_2 \\ 0 & \tilde{s}_3 \end{bmatrix},$$

$\tilde{s}_k$ being defined as $\tilde{s}_k = \mathrm{Re}\{s_k e^{j\theta}\} + j\mathrm{Im}\{s_l e^{j\theta}\}$, for k=0 to 3, l=k+2 modulo 4.

The sequence of symbols may be transmitted over frequency and spatial dimensions.

The sequence of symbols may be transmitted over frequency, time and spatial dimensions.

Another embodiment of the invention is a device for transmitting an input signal through at least a channel in a wireless communication system, wherein the device comprises at least:
- a forward-error correction encoder for encoding the input signal,
- a plurality of transmit antennas, and
- a mapping module implementing the method described above.

Other features and advantages will appear more clearly from the description of one embodiment of the invention made hereinafter, as an indication and by no means restrictive.

DETAILED DESCRIPTION

A main focus of an embodiment is spatial multiplexing (SM). Spatial multiplexing is a transmission technique in MIMO wireless communication to transmit independent and separately encoded data signals, so called streams, from each of multiple transmit antennas, the space dimension being reused, or multiplexed, more than one time, allowing one to increase the peak error-free data rate (that is to say the maximum possible number of symbols transmitted over the antennas).

Generally, spatial multiplexing uses signals that originate from one or more independent sources that have been modulated with identical or different information-bearing signals and that may vary in their transmission characteristics at any given instant. For spatial multiplexing, the transmit diversity can be exploited by means of forward-error-correction (FEC), and may be based on the transmission of the vector $X=[s_1, s_2, \ldots s_N]^T$ over T=1 time slot, where N denotes the number of symbols to be transmitted and $[\ ]^T$ denotes the transpose operator, and $s_k$ (k=1 to N) are the symbols to be transmitted.

In order to benefit from the FEC encoder for exploiting the transmit diversity more efficiently and to provide better performance compared to existing alternatives with a slight complexity increase at the transmitter, an embodiment for transmitting data through at least a channel in a wireless communication system, may comprise at least the steps of:
- encoding the data by performing a forward-error-correction encoding,
- forming a sequence of independent symbols from the encoded data,
- forming an M-by-T coding matrix with said sequence of independent symbols, said coding matrix comprising only the symbols of said sequence of independent symbols and zeros, each column of the coding matrix comprising N different symbols of the sequence of independent symbols and M−N zeros, N being an integer equal at least to one, T being an integer equal at least to two and representing the number of consecutive transmission intervals, M being an integer greater than N and representing the total number of transmit antennas, at least two columns of said coding matrix having zeroes at different locations, and
- using the coding matrix for transmitting the sequence of independent symbols during the T consecutive transmission intervals, by transmitting one different column of the coding matrix at each transmission interval through N transmit antennas over the M transmit antennas.

Therefore, N different independent symbols per time slot are transmitted (total of NT symbols over T time slots) over M transmit antennas using where M>N N≥1 and T≥1 for example.

As the sequence comprises independent symbols (no symbols repeated under a modified or non-modified form in the sequence) and as the coding matrix comprises only the symbols of this sequence and zeros, no redundant information is transmitted.

These schemes can be smartly implemented using only N radio frequency (RF) chains with transmit antennas switches.

On the other hand, a receiver used for spatial multiplexing having the same number of symbols can be used. In other words, detection complexity is determined by the number N of symbols to be transmitted per time slot. Furthermore, the method can also be implemented over only the frequency dimension or over both the time and frequency dimensions instead of over only the time dimension, for example, in OFDM (orthogonal frequency division multiplexing) and OFDMA (orthogonal frequency division multiple-access) systems.

A first example may be based on SM with the number of symbols to be transmitted per time slot equal to two (N=2), the total number of time slots may be equal to two (T=2). In this scheme, the N symbols may be multiplexed randomly or in a precise order through M number of transmit antennas where M is larger than two (that is to say using different combinations for transmitting the symbols depending on the number of time slots and the number of transmit antennas). Through additional antennas, some diversity may be efficiently revealed when exploited by a FEC encoder/decoder. For example, with M=4 transmit antennas, the coding matrix can be expressed as:

$$X4 = \begin{bmatrix} s_1 & 0 \\ s_2 & 0 \\ 0 & s_3 \\ 0 & s_4 \end{bmatrix} \quad (5)$$

This scheme may allow a FEC encoder to exploit the available transmit diversity more efficiently. In the scheme given by (5), two transmit antennas are enabled for transmitting two symbols at a given time slot. For sufficiently uncorrelated transmit antennas, diversity may be exploited over a larger number of antennas.

In particular, with PUSC (partial usage of subchannels) permutation defined in IEEE 802.16e specifications, the coding matrix X4 may provide considerable performance gain (approximately 2 dB for QPSK ¾ below BER of $10^{-3}$, QPSK being the acronym of Quadrature phase-shift keying, and BER being the acronym of Bit-Error-Rate) compared to Matrix B2 given above for example. Therefore, the performance of the existing schemes may be improved introducing only a slight complexity increase at the transmitter. Indeed, the coding matrix X4 provides the same transmission rate as the matrix B2 given in (2) for two transmit antennas with the same detection complexity, that is to say with a detector having a linear detection complexity. This gain may be much higher if AMC (adaptive modulation and coding) permutation is used instead of PUSC.

Another embodiment may include in the generalization of the coding matrix X4 for a number of time slots T more than two. For example, for schemes with N=2 and M=4, the following transmission schemes X41 for T=3 and X42 for T=4 time slots may be used:

$$X41 = \begin{bmatrix} s_1 & 0 & s_5 \\ s_2 & 0 & 0 \\ 0 & s_3 & s_6 \\ 0 & s_4 & 0 \end{bmatrix}, \quad (6)$$

$$X42 = \begin{bmatrix} s_1 & 0 & s_5 & 0 \\ s_2 & 0 & 0 & s_7 \\ 0 & s_3 & s_6 & 0 \\ 0 & s_4 & 0 & s_8 \end{bmatrix}$$

These schemes and all other possible derivatives may benefit more from transmit diversity, and do not need any additional process for detection at the receiver.

The following transmission schemes X43 for T=4 and X44 for T=4 time slots may also be used:

$$X43 = \begin{bmatrix} s_1 & s_3 & 0 & 0 \\ s_2 & s_4 & 0 & 0 \\ 0 & 0 & s_5 & s_7 \\ 0 & 0 & s_6 & s_8 \end{bmatrix},$$

$$X44 = \begin{bmatrix} s_1 & s_3 & s_5 & 0 \\ s_2 & s_4 & s_6 & 0 \\ 0 & 0 & 0 & s_7 \\ 0 & 0 & 0 & s_8 \end{bmatrix}$$

Another embodiment of the invention provides alternatives to SM with three transmit antennas. In this case, different schemes with N=3 and T=2 may be defined as:

$$X45 = \begin{bmatrix} s_1 & 0 \\ s_2 & s_4 \\ s_3 & s_5 \\ 0 & s_6 \end{bmatrix}, \quad (7)$$

$$X5 = \begin{bmatrix} s_1 & 0 \\ s_2 & 0 \\ s_3 & s_4 \\ 0 & s_5 \\ 0 & s_6 \end{bmatrix},$$

$$X6 = \begin{bmatrix} s_1 & 0 \\ s_2 & 0 \\ s_3 & 0 \\ 0 & s_4 \\ 0 & s_5 \\ 0 & s_6 \end{bmatrix}$$

for M=4, 5, and 6, respectively, and extensions like (6) for a number of time slots T more than two are straightforward. All of these alternatives and other possible versions with the same value of N (number of symbols to be transmitted per time slot) have the same transmission rate, and the same decoding complexity as that of SM for three transmit antennas defined above as B3. These schemes may benefit more efficiently from transmit diversity than the scheme B3.

It is straightforward to express other alternatives of the presented examples for any number M of transmit antennas with different permutations over time and spatial dimensions.

Generally speaking, efficient exploitation of transmit diversity with FEC may be realized with N×T symbols (N≥1, T≥2) based on spatial multiplexing using M transmit antennas larger than N (M>N) and over T time slots. Note that for N=1, only one symbol is transmitted over one time slot and only one transmit antenna is active at each time slot.

In another embodiment, in addition to the mentioned properties, different swapping strategies may be realized between in-phase and quadrature components of the symbols rotated with a phase shift θ and transmitted over different time slots. In this case, it may also be possible to increase the rank of the matrix. This may allow a further performance improvement in a rich scattering environment. As an example, one may choose one of the above mentioned schemes in which at least one transmit antenna is active in two time slots. For the sake of simplicity, an example is given below for N=2, M=3 and T=2 as:

$$X3 = \begin{bmatrix} \tilde{s}_0 & 0 \\ \tilde{s}_1 & \tilde{s}_2 \\ 0 & \tilde{s}_3 \end{bmatrix} \quad (8)$$

Here, $\tilde{s}_k$ may be defined as $\tilde{s}_k = \text{Re}\{s_k e^{j\theta}\} + j\text{Im}\{s_l e^{j\theta}\}$, for k=0 to 3, l=k+2 modulo 4. In this case, not only the FEC encoder but also the space time coding (STC) matrix itself exploits the transmit diversity. The idea may be similarly generalized as explained above for N symbols transmission and M>N transmit antennas over two or more successive time slots.

In another embodiment, the symbols may be transmitted over either the frequency dimension or over a combination of the frequency and time dimensions in addition to the spatial dimensions. In particular, the method explained above may be applied over different frequencies and/or different time slots, for example in an OFDM or OFDMA system.

Coding matrix X42 may be considered as an example of a combination of frequency and time slots. In this case, the first two columns of X42 may be transmitted over a first time slot T1 and the last two columns of X42 may be transmitted over a second time slot T2. In addition, the same frequency may be used for transmission of odd numbered columns and a different frequency for even numbered columns.

Naturally, in order to satisfy local and specific requirements, a person skilled in the art may apply to the embodiments described above many modifications and alterations. Particularly, although one or more embodiments have been described with a certain degree of particularity, it should be understood that various omissions, substitutions, and changes in the form and details as well as other embodiments are possible. Moreover, it is expressly intended that specific elements and/or method steps described in connection with any disclosed embodiment may be incorporated in any other embodiment as a general matter of design choice.

What is claimed is:

1. A method for transmitting data through at least a channel in a wireless communication system, the method comprising:
   encoding the data by performing a forward-error-correction encoding,
   forming a sequence of independent symbols from the encoded data,
   forming an M-by-T coding matrix from said sequence of independent symbols, said coding matrix comprising only the symbols of said sequence of independent symbols and zeros, each column of the coding matrix comprising N different symbols of the sequence of symbols and M−N zeros, N being an integer equal at least to one, T being an integer equal at least to two and representing the number of consecutive transmission intervals, M being an integer greater than N and representing the total number of transmit antennas, at least two columns of said coding matrix having zeros at different locations, and
   using the coding matrix for transmitting the sequence of independent symbols during the T consecutive transmission intervals, by transmitting one different column of the coding matrix at each transmission interval through N transmit antennas over the M transmit antennas.

2. The method according to claim 1, wherein the coding matrix is defined as:

$$X4 = \begin{bmatrix} s_1 & 0 \\ s_2 & 0 \\ 0 & s_3 \\ 0 & s_4 \end{bmatrix},$$

being the coding matrix, and
$s_1, s_2, s_3, s_4$ being respectively first, second, third and fourth symbols forming the sequence of symbols.

3. The method according to claim 1, wherein the coding matrix comprises symbols with swapped in-phase and quadrature components over time and spatial dimensions.

4. The method according to claim 1 wherein the sequence of symbols is transmitted over frequency and spatial dimensions.

5. The method according to claim 2, wherein the sequence of symbols is transmitted over frequency and spatial dimensions.

6. The method according to claim 3, wherein the sequence of symbols is transmitted over frequency and spatial dimensions.

7. The method according to claim 1, wherein the sequence of symbols is transmitted over frequency, time and spatial dimensions.

8. The method according to claim 2, wherein the sequence of symbols is transmitted over frequency, time and spatial dimensions.

9. The method according to claim 3, wherein the sequence of symbols is transmitted over frequency, time and spatial dimensions.

10. A method for transmitting data through at least a channel in a wireless communication system, the method comprising:
    encoding the data by performing a forward-error-correction encoding,
    forming a sequence of independent symbols from the encoded data,
    forming an M-by-T coding matrix from said sequence of independent symbols, said coding matrix comprising only the symbols of said sequence of independent symbols and zeros, each column of the coding matrix comprising N different symbols of the sequence of symbols and M−N zeros, N being an integer equal at least to one, T being an integer equal at least to two and representing the number of consecutive transmission intervals, M being an integer greater than N and representing the total number of transmit antennas, at least two columns of said coding matrix having zeros at different locations, and using the coding matrix for transmitting the sequence of independent symbols during the T consecutive transmission intervals, by transmitting one different column of the coding matrix at each transmission interval through N transmit antennas over the M transmit antennas;

wherein the coding matrix comprises rotated symbols with swapped in-phase and quadrature components over time and spatial dimensions; and wherein the coding matrix is defined as:

$$X3 = \begin{bmatrix} \tilde{s}_0 & 0 \\ \tilde{s}_1 & \tilde{s}_2 \\ 0 & \tilde{s}_3 \end{bmatrix},$$

$\tilde{s}_k$ being defined as $\tilde{s}_k = \text{Re}\{s_k e^{j\theta}\} + j\text{Im}\{s_l e^{j\theta}\}$, for k=0 to 3, l=k+2 modulo 4.

11. The method according to claim 10, wherein the sequence of symbols is transmitted over frequency and spatial dimensions.

12. The method according to claim 10, wherein the sequence of symbols is transmitted over frequency, time and spatial dimensions.

13. A device for transmitting an input signal through at least a channel in a wireless communication system, the device comprising:

a forward-error correction encoder for encoding the input signal, a plurality of transmit antennas, and a mapping module configured to:
encode data by performing a forward-error-correction encoding,
form a sequence of independent symbols from the encoded data,
form an M-by-T coding matrix from said sequence of independent symbols, said coding matrix comprising only the symbols of said sequence of independent symbols and zeros, each column of the coding matrix comprising N different symbols of the sequence of symbols and M−N zeros, N being an integer equal at least to one, T being an integer equal at least to two and representing the number of consecutive transmission intervals, M being an integer greater than N and representing the total number of transmit antennas, at least two columns of said coding matrix having zeros at different locations, and
use the coding matrix for transmitting the sequence of independent symbols during the T consecutive transmission intervals, by transmitting one different column of the coding matrix at each transmission interval through N transmit antennas over the M transmit antennas.

14. The system according to claim 13, wherein the coding matrix is defined as:

$$X4 = \begin{bmatrix} s_1 & 0 \\ s_2 & 0 \\ 0 & s_3 \\ 0 & s_4 \end{bmatrix},$$

being the coding matrix, and $s_1, s_2, s_3, s_4$ being respectively first, second, third and fourth symbols forming the sequence of symbols.

15. The system according to claim 13, wherein the coding matrix comprises symbols with swapped in-phase and quadrature components over time and spatial dimensions.

16. The system according to claim 13, wherein the coding matrix is defined as:

$$X3 = \begin{bmatrix} \tilde{s}_0 & 0 \\ \tilde{s}_1 & \tilde{s}_2 \\ 0 & \tilde{s}_3 \end{bmatrix},$$

$\tilde{s}_k$ being defined as $\tilde{s}_k = \text{Re}\{s_k e^{j\theta}\} + j\text{Im}\{s_l e^{j\theta}\}$, for k=0 to 3, l=k+2 modulo 4.

17. The system according to claim 13, wherein the sequence of symbols is transmitted over frequency and spatial dimensions.

18. The system according to claim 13, wherein the sequence of symbols is transmitted over frequency, time and spatial dimensions.

* * * * *